(12) United States Patent
Menegoli

(10) Patent No.: US 12,467,261 B2
(45) Date of Patent: Nov. 11, 2025

(54) COATING COVER FOR ROOFS OF BUILDINGS

(71) Applicant: Mauro Menegoli, San Pietro in Cariano (IT)

(72) Inventor: Mauro Menegoli, San Pietro in Cariano (IT)

( * ) Notice: Subject to any disclaimer, the term of this patent is extended or adjusted under 35 U.S.C. 154(b) by 314 days.

(21) Appl. No.: 18/027,070

(22) PCT Filed: Sep. 16, 2021

(86) PCT No.: PCT/IB2021/058441
§ 371 (c)(1),
(2) Date: Mar. 17, 2023

(87) PCT Pub. No.: WO2022/058918
PCT Pub. Date: Mar. 24, 2022

(65) Prior Publication Data
US 2023/0323668 A1    Oct. 12, 2023

(30) Foreign Application Priority Data

Sep. 18, 2020    (IT) .................. 102020000022123

(51) Int. Cl.
*E04D 3/36* (2006.01)
*E04D 3/362* (2006.01)
(Continued)

(52) U.S. Cl.
CPC ............. *E04D 3/362* (2013.01); *E04D 3/363* (2013.01); *E04D 13/0445* (2013.01); *E04D 2003/3612* (2013.01)

(58) Field of Classification Search
CPC ..... E04D 3/362; E04D 3/363; E04D 13/0445; E04D 2003/3612; E04D 2003/3615;
(Continued)

(56) References Cited

U.S. PATENT DOCUMENTS

| | | | |
|---|---|---|---|
| 4,114,247 A * | 9/1978 | Toti ...................... | F16B 5/0004 29/525 |
| 5,187,911 A * | 2/1993 | Cotter .................... | E04D 3/363 52/537 |
| 9,797,145 B2 * | 10/2017 | Llapart Ramos ....... | E04F 13/12 |

FOREIGN PATENT DOCUMENTS

| | | |
|---|---|---|
| CN | 110241981 A | 9/2019 |
| EP | 0634535 B1 | 1/1995 |

(Continued)

OTHER PUBLICATIONS

International Search Report for PCT/IB2021/058441, dated Nov. 12, 2021.

*Primary Examiner* — Patrick J Maestri
(74) *Attorney, Agent, or Firm* — Seyfarth Shaw LLP

(57) ABSTRACT

A coating cover with a metal structure for roofs of buildings comprises a plurality of slabs of substantially quadrilateral shape, each of which is provided with lateral edges that are parallel and opposite to one another for mutual connection between adjacent slabs in a longitudinal direction and for formation of a joint positioned between each of the adjacent slabs. The lateral edges comprise a first set of folds at least partially symmetrical on the two edges. The lateral edges also include a second set of folds on at least one of the lateral edges, and a third set of folds on at least one other lateral edge. The lateral edges comprise at least one curvature at one of the first set of folds placed horizontal and parallel to the installation base. The cover also has at least one fixing bracket that is configured to join the lateral edges.

11 Claims, 7 Drawing Sheets

(51) Int. Cl.
*E04D 3/363* (2006.01)
*E04D 13/04* (2006.01)
*E04D 3/361* (2006.01)

(58) Field of Classification Search
CPC .......... F16B 2005/0678; F16B 2200/83; F16B 2/10; F16B 5/004; F16B 5/0056; F16B 5/0635
See application file for complete search history.

(56) References Cited

FOREIGN PATENT DOCUMENTS

| | | | |
|---|---|---|---|
| EP | 0964114 | B1 | 12/1999 |
| EP | 1989366 | B1 | 12/2008 |
| GB | 1042241 | A | 9/1966 |

* cited by examiner

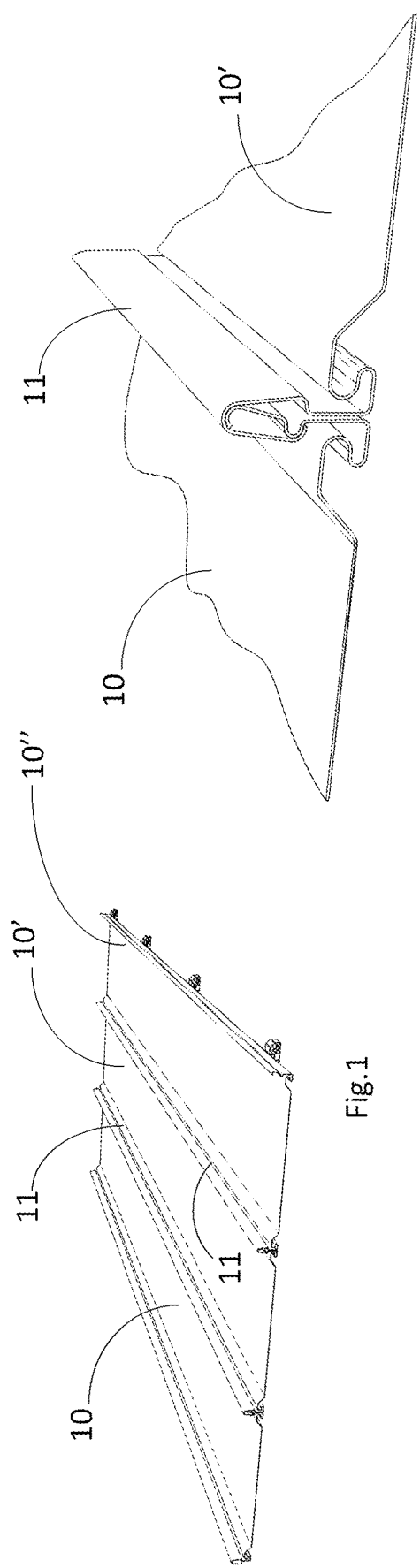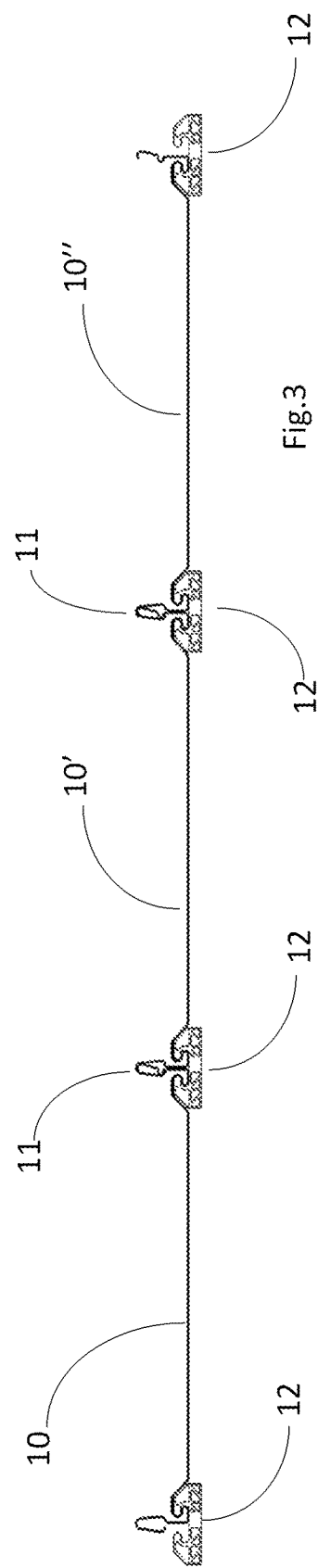

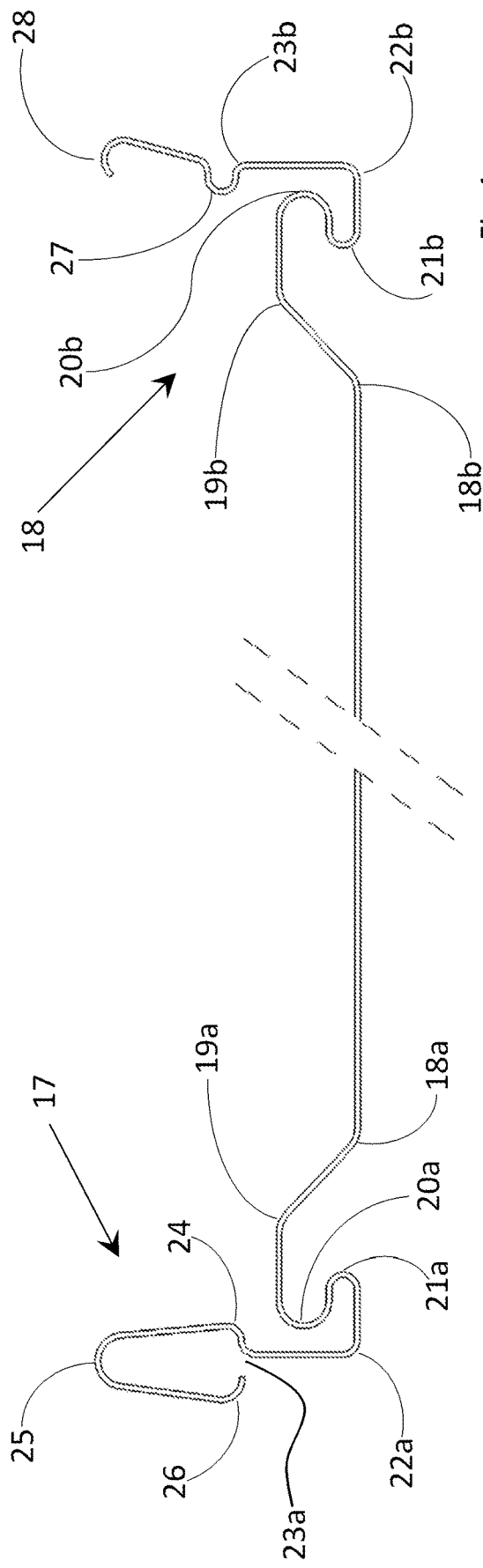
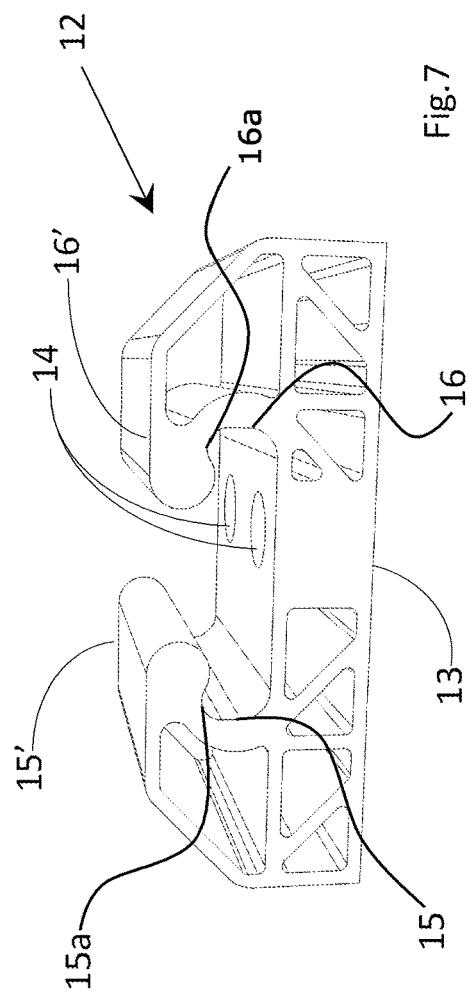

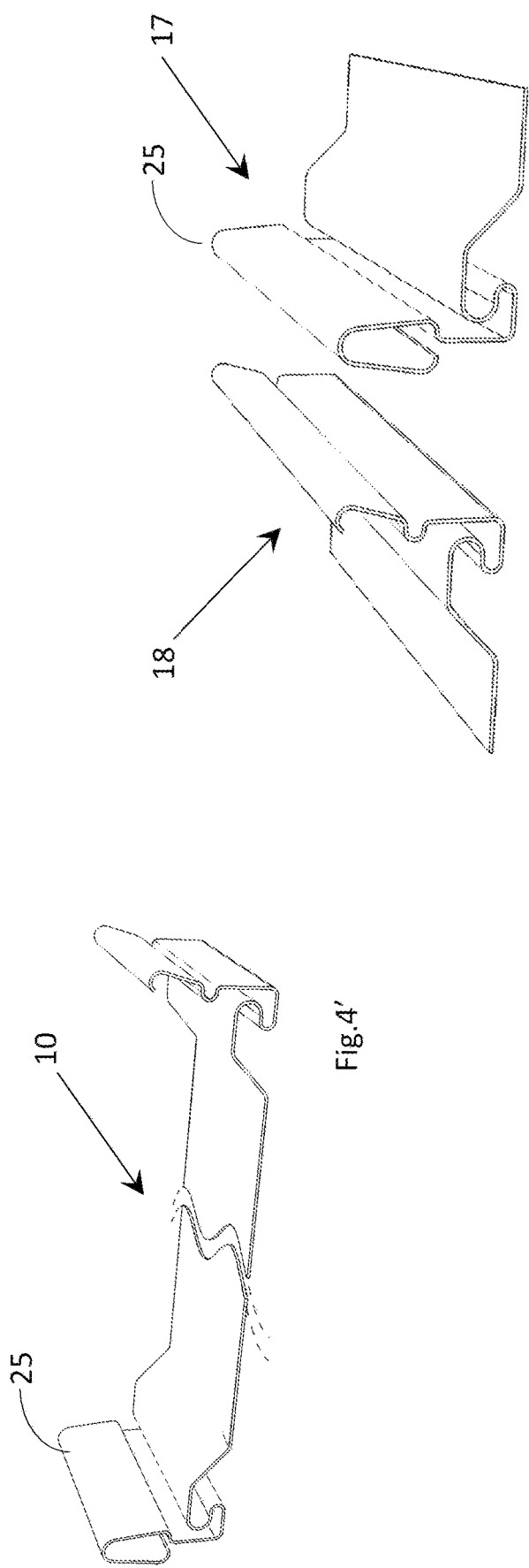

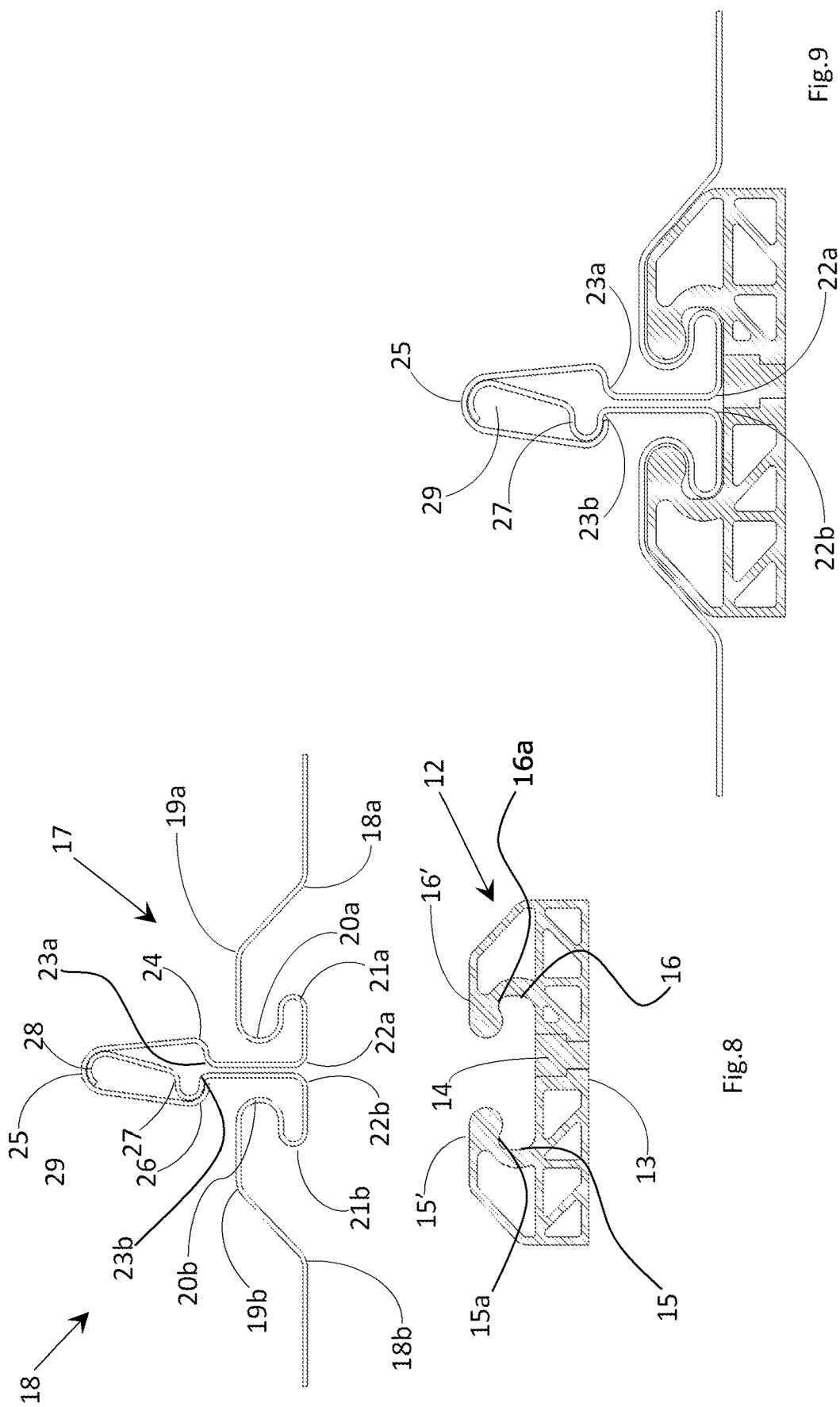

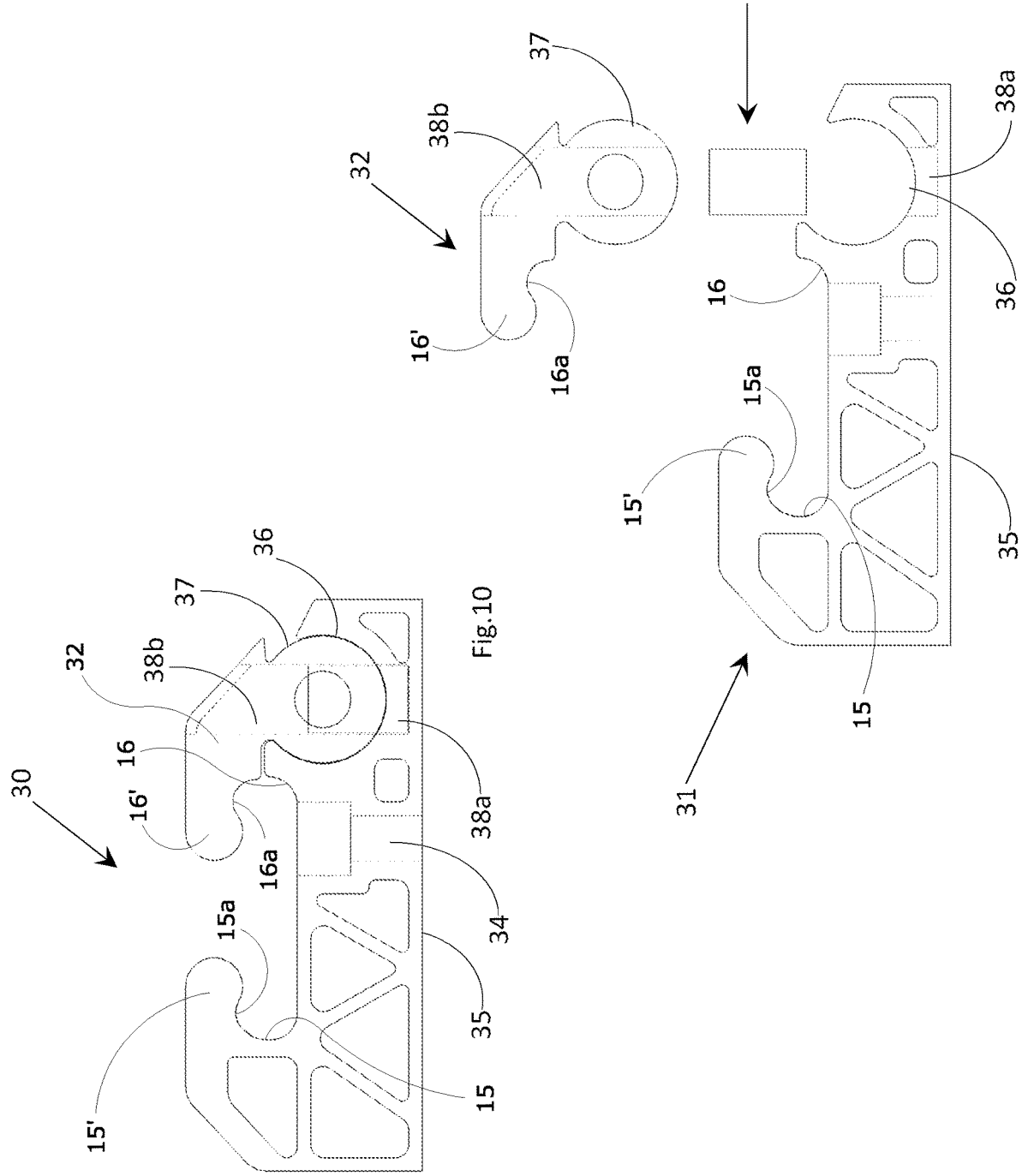

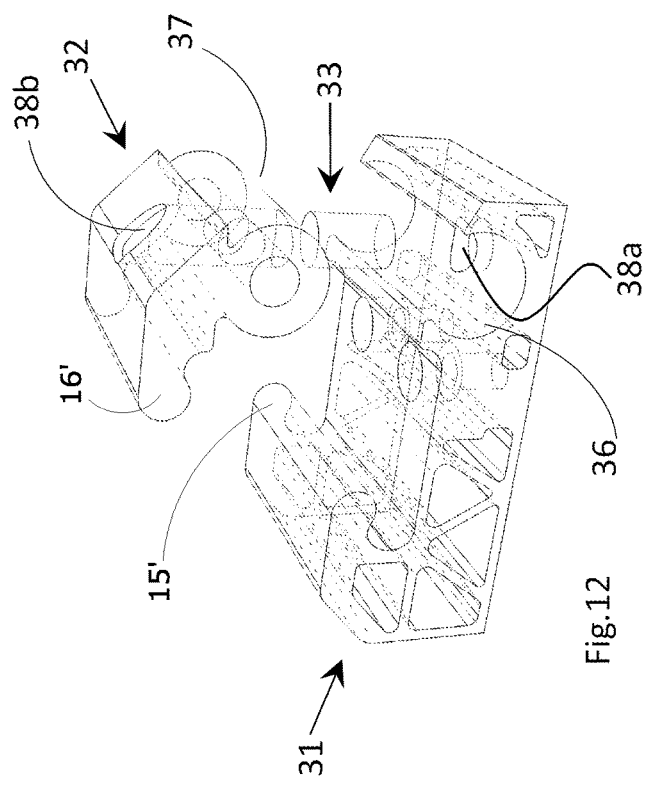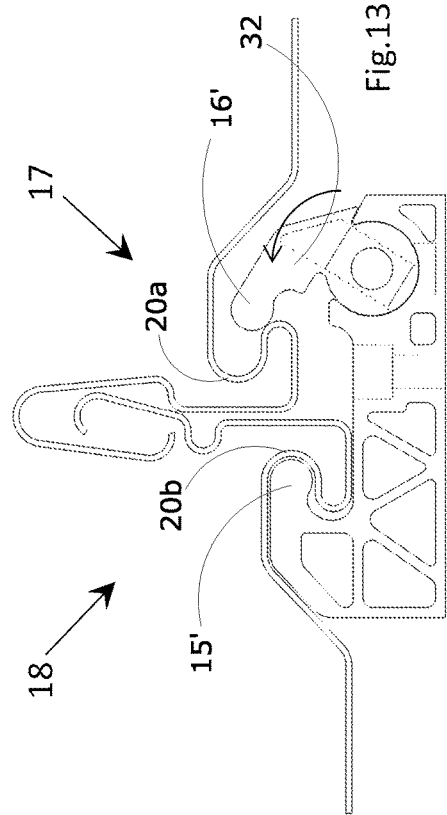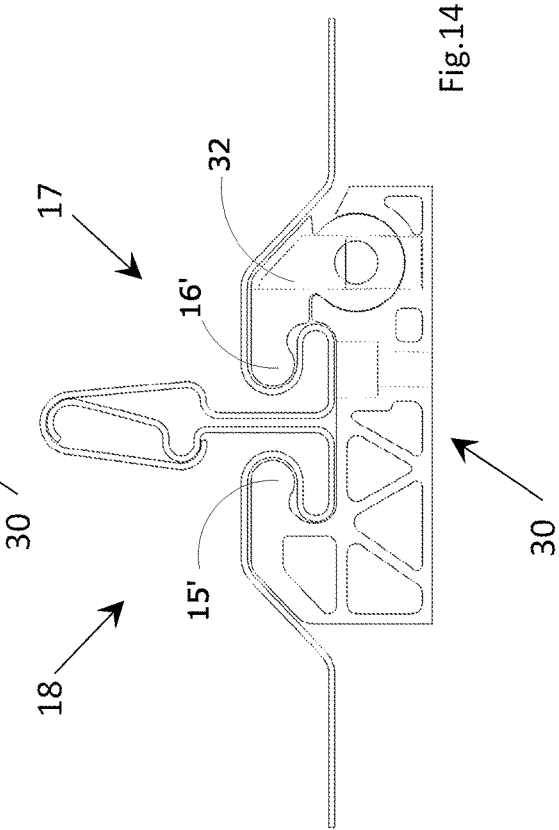

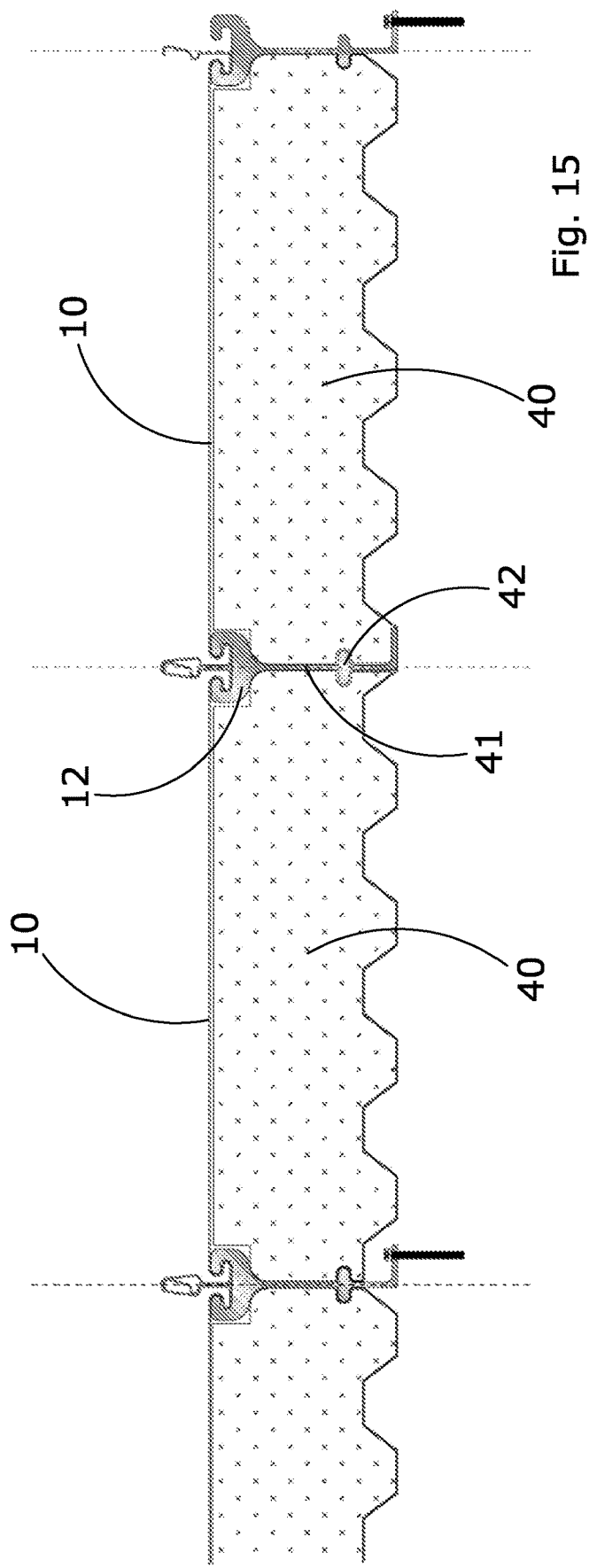

COATING COVER FOR ROOFS OF BUILDINGS

FIELD OF APPLICATION

The present invention relates preferably although not exclusively to a high-performance metal cover for roofs of buildings.

In particular, the metal cover according to the invention uses a plurality of metal slabs adjacent to one another and connected by the special shaping of the lateral edges thereof.

Such edges are fixed on the underlying structure by means of brackets and the system thus made forms a continuous cover that is easy and rapid to install, long-lasting, very resistant to wind and appropriate for the protection of the underlying building.

The present invention is advantageously applied in the sector of coverings for roofs of buildings in general and panel coverings in particular with a metal structure.

PRIOR ART

The use in the construction sector of various types of coverings for buildings is known, which in some cases, as in industrial buildings, establishments, airports or the like, are constituted by adjacent panels or slabs.

The coverings of roofs with large-surface elements, being panels or slabs, is usual for large surfaces, such as industrial sheds, or production facilities, or large infrastructures, because of the greater implementation speed and low cost thereof.

The panels and slabs for coverings of buildings are prefabricated elements having large surfaces and supplied directly to the construction site, ready to mount and equipped with all the components and accessories for realising the complete cover.

Such panels are made of various metals, aluminium, copper, zinc, steel or the like, or of plastic materials, ABS, polycarbonate, PVC, or the like.

The slabs that make them up can have various dimensions, both in length (from less than one metre up to hundreds of metres) and in width, which is usually not greater than a metre, both for static reasons and for the limitation in width of the starting laminated strip that is known as a coil.

It is also known in this sector that the lateral edges of the covering panels or slabs can be connected to enable joining thereof in very many ways, from a simple superposing of the edges to very complex geometries with drainage channels in the joint, fixing surfaces to the sub-structure, utilising geometries suitable for special fixing systems.

In the latter case, in which geometries suitable for special fixing systems are used, the fixing brackets can be made of metal or plastic materials, can avoid the need for piercing of the slabs, and can allow for dilation of the slabs in the lengthwise direction.

Further, the choice of geometry of the slab and the metal in production determines the frequency of the fixings in the lengthwise direction and the mechanical performance at concentrated positive load, for example so as to support foot traffic, at distributed load, like snow and wind, and at negative load, as in the typical cases of wind uplift, i.e. the lifting thrust of the wind.

To complete the system there exist innumerable systems outside the slabs for fixing, with or without piercing, clamps, hooks etc., made of various materials and suitable for application of various accessories on the roof, such as snow catches, anti-fall systems, solar panels, walkways, plants, etc.

One example of such cover systems is described in documents EP 0964114 and EP0634535 which propose providing systems for connecting or constraining accessories to coating panels or slabs for covering buildings which enables joining the overlapped edging of two adjacent panels without any need for piercing the panels/slabs to which the assembly is applied.

According to the first solution the use of gripping and hooking components is included, which gripping and hooking components are applicable on the joined edges of two adjacent panels, which are fixable by use of a tightening and constraint component which, in this case, has the characteristic of including at least one part being adapted to enable the constraint of an accessory, represented for example by solar panels or other components and accessories located on the cover.

In the second case, the system comprises a plurality of metal sheets to be connected together along portions of lateral edges that are shaped to define a first longitudinal projection facing laterally outwards, and several mounting brackets to be anchored to a roof. Each bracket comprises at least one longitudinal groove for housing in a snap-fit coupling the first longitudinal projections of the adjacent panels so that the first longitudinal projections have opposite upper surfaces that are at least partially flat and substantially parallel or slightly tilted to promote the action of retaining the panels and increase the separating load that would cause the detachment of the edge portions.

Despite some of the systems having good performance characteristics, however, technology proposes continuous improvements both to the geometric configuration of the edges of the slabs and to the means used for mutual connection, which are designed, as in the case of the present invention, also by virtue of the constantly increasing requests for higher performance components for covering buildings because of the serious climatic changes that have greatly increased the cases of typhoons and hurricanes and as a result of roofs blown off and new architectural and structural needs.

DESCRIPTION OF THE INVENTION

The present invention aims to provide a metal coating cover for roofs of buildings which uses a plurality of metal slabs adjacent to one another and connected by the special shaping of the lateral edges thereof which is able to improve the general performance of the system to meet the requirements highlighted above.

In particular the invention proposes providing a metal coating cover for roofs of buildings, the slabs of which, positioned adjacent to one another, comprise edges which are fixed on the underlying structure by means of specially shaped brackets and the system thus made forms a continuous cover that is easy and rapid to install, long-lasting, very resistant to wind and perfectly adequate for the protection of the underlying building.

An important objective proposed by the present invention to significantly improve the performance of the covering system in place, enabling an increase in terms of distance, or span, between successive rests in the lengthwise direction of the slabs, and/or a greater resistance to the wind-uplift phenomenon, i.e. the resistance to the lifting thrust of the wind.

A further object of the present invention is to improve the sliding of the slabs into the respective fixing brackets in order to enable free longitudinal dilation of the slabs themselves, enabling the manufacturing of even very long slabs (well above 100 metres), without this compromising and limiting the wind-uplift value, as instead happens with existing systems.

A further object of the invention is to reduce to a minimum the number of folds of the profile of the edges of the panels to be placed against one another, in the interest of greater production cost effectiveness.

A further objective of the invention is to maintain for these folds of the profile of the edges of the panels to be placed against one another with a curvature radius that is sufficiently wide, so as to enable the use of hard metal alloys, for example aluminium alloys, on the one hand avoiding the risk of formation of cracks, which can lead to the breakage of the material, and on the other hand avoiding the possibility of whitening of some types of colouring of the surface, which occurs for example using PVDF paints that may involve so-called whitening phenomena, which is particularly unwelcome in dark colourings.

Another objective of the invention is to facilitate the mounting of external clamps, without any need to pierce the slabs, but guaranteeing great resistance thereof to the lateral, longitudinal and extraction stresses, without however increasing friction between the slabs and the fixing brackets.

This is obtained through a coating cover for roofs with a metal structure of buildings, comprising a plurality of metal slabs adjacent to one another and connected by the special shaping of the lateral edges thereof and locked by special brackets, the characteristics of which are described in the main claim.

The dependent claims of the present solution delineate advantageous embodiments of the invention.

ILLUSTRATION OF THE DRAWINGS

Further characteristics and advantages of the invention will become apparent from reading the following description of an embodiment of the invention provided by way of non-limiting example, with the aid of the figures illustrated in the appended tables of drawings, in which:

FIG. 1 illustrates the schematic view in axonometric perspective of three coating slabs according to the invention, connected to one another and to the underlying surface by the brackets indicated on the front;

FIG. 2 illustrates a detail of two edges and two coating slabs according to the invention placed against one another and maintained in retaining position by a mutual interlock;

FIG. 3 shows a schematic perspective frontal view of three coating slabs according to the invention shows a schematic perspective frontal view of three coating slabs according to the invention for connection between the slabs and the sub-structure, not illustrated;

FIGS. 4 and 4' represent a schematic view of a portion of one of the coating slabs according to the invention, provided with opposite edges,
   each having a complementary geometric shaping with respect to one another, to enable joining between slabs placed against one another; to enable joining between panels placed against one another;

FIG. 5 represents a schematic view in axonometric perspective of two edge portions of two distinct coating panels mutually placed against one another and located at a certain distance, i.e. prior to being joined;

FIG. 6 illustrates a frontal view of the edges of two different adjacent panels placed against one another prior to being joined;

FIG. 7 represents a schematic view in axonometric perspective of one of the brackets utilised for safely retaining the edges of the joined panels and for fixing them on the sub-structure, not illustrated;

FIGS. 8 and 9 are detailed frontal schematic views which show the co-penetration of the shaped profiles of two edges placed against one another of slabs, respectively before and after the introduction of the locking bracket;

FIGS. 10 to 14 represent schematic views highlighting a possible further embodiment of the invention;

FIG. 15 shows a further possible embodiment relating to the connection between the slabs and a sandwich panel.

DESCRIPTION OF AN EMBODIMENT OF THE INVENTION

With reference to the appended figures, and initially in particular to FIG. 10, denotes in its entirety a coating cover for roof of buildings with a metal frame defining a first slab 10, while 10' and 10" denote the adjacent slabs.

Each slab 10 has a substantially rectangular conformation, indicatively a width of about 0.5 metres and a length that can also be much above 100 metres, which, given the specific conformation thereof, is makable using hard metal alloys, for example aluminium.

The slabs 10 are destined to be mutually joined to form the whole cover and for this purpose each pair of consecutive slabs coupled to one another form a longitudinal joint 11.

The connecting element of such a joint 11 is constituted by the geometry of the edges of the slabs, which are mutually retained, both by the mutual co-penetration thereof and by fixing brackets 12 which join to one another two consecutive slabs and guarantee fixing of the slabs to the underlying structure, not illustrated.

The fixing brackets 12 are arranged in relation to the design, and in a normal situation, but not every situation, they would be aligned in a transverse direction in every joint 11 between the slabs 10, thus at a distance that coincides with the width of the slab, and aligned in a longitudinal direction at a distance that coincides with the rests of the underlying structure, not illustrated herein.

The joint 11 further guarantees the seal of the roof against penetration of water and air. The described system adapted in the longitudinal direction with the length of the slabs, and in a transverse direction with the multitude of coupled slabs, forms a single continuous surface that constitutes the cover in its entirety.

According to an embodiment shown in FIG. 7, the fixing brackets 12 comprise a body typically made with a plastic material, or a metal material, or a group of these materials, or other materials, having a conformation generally defined by a flat base surface 13 that rests on the sub-structure of the roof, to which it remains fixed.

The fixing bracket 12 comprises two holes 14 which constitute the housing of the fixing elements to the sub-structure, typically screws, or other suitable elements.

According to the embodiment shown in FIG. 7, the fixing bracket 12 has a central axis of frontal symmetry and has a shaping that enables two consecutive slabs 10 to be fixed.

Shaping the fixing bracket 12 defines two opposite recesses 15 and 16, formed respectively by two portions 15' and 16' protruding upwards and folded to face one another in a reciprocally specular manner towards the common middle plane of symmetry.

The two recesses 15 and 16, positioned specularly relative to the common middle plane of symmetry, have a low part that is horizontal and parallel to the rest surface 13, whereas the high part has a geometry with further indentations 15a and 16a upwards in the distal portion relative to the middle axis, adapted to receive the corresponding portion of slab only during the wind uplift step. These indentations 15a and 16a determine the best performance in relation to wind uplift, i.e. the lifting thrust of the wind.

With reference to the embodiment illustrated in FIG. 4, every single slab has two opposite lateral edges 17 and 18 that are only partially symmetrical to one another, from the first fold, proximal with respect to the central axis of the slab, as far as the sixth fold.

According to the embodiment shown in FIGS. 4 and 8 the opposite lateral edges 17 and 18 of each slab comprise folds 18a, 19a and 20a, made on the lateral edge 17 and corresponding folds 18b, 19b and 20b made on the lateral edge 18, which are symmetrical to one another and coincide with the geometry of the fixing bracket 12. As is visible in FIGS. 4 and 7, the process that corresponds to the folds 21a, 21b of the slab is housed in the recesses 15 and 16 of the fixing bracket 12, nevertheless, the slab does not have further indentations 15a and 16a that are on the other hand present on the bracket. These indentations will abut on the folds 21a and 21b of the slab, which are symmetrical to one another, only during the rotation of the corresponding portion during the wind uplift step.

Still symmetrically, the folds 22a and 22b, respectively at the lateral edges 17 and 18 of the slab, return the slab to a substantially vertical position with an upward direction. The opposite lateral edges 17 and 18 of two contiguous slabs, as shown in FIG. 8, become parallel, opposite and substantially adhere in this vertical portion, after the folds 22a, 22b and before the folds 23a, 23b.

Lastly, the two folds 23a and 23b, respectively lateral edges 17 and 18 of the slab are also substantially symmetrical. These two folds lead the two contiguous slabs to continue horizontally to the outside with respect to the middle plane of the joint 11.

At the portion between the folds 22a, 22b and 23a, 23b, an external fixing system can be mounted for mounting accessories, such as snow catches, anti-fall systems, solar panels, or others besides.

The fact that the two slabs are adhering, permits, with no need for piercing the slab, a very effective and resistant locking, by means of an external clamp, not illustrated, which is opposed to both longitudinal stresses and upwards vertical stresses.

This clamp, when tightened, does not deform the slabs and does not lock them in the support bracket, enabling free longitudinal dilation, even in the case of slabs of significant length.

The following geometries of the two sides are differentiated.

According to the embodiment shown in FIG. 4, on the lateral edge 17, the slab 10, after the fold 23a, continues upwards by means of the fold 24, to then form a curve of about 180° at the fold 25, covering, when engaged in the joint 11, the lateral edge 18 of the opposite slab.

Lastly, the edge 17 of the slab 10, has, at the end thereof, a fold 26, that, when it is engaged in the longitudinal joint 11, comes to adhere to the fold 27 of the opposite slab.

The coupling between the folds 26 and 27, as a sealing, exploits the elasticity of the construction material of the slabs and represents an element with an excellent seal against water, as the external surface exposed to a pressure determined by the level of the rising water pushes the edge 17 and the last fold 26 against the fold 27 with an intrinsically positive cohesion mechanism: the greater the pressure the better the seal.

Still with reference to FIG. 4, the lateral edge 18 of the slab 10 continues after the fold 23b with a fold 27, opposite the fold 26 of the opposite lateral edge 17, lastly continues upwards as far as the end fold 28, which contrasts the inside of the fold 25 of the opposite lateral edge 18.

According to the embodiment shown in FIG. 8, at the fold 25 of the lateral edge 17 of each slab 10 the last two folds 27 and 28 of the lateral edge 18 determine the formation of a channel 29, which is visible in FIG. 9, dedicated to collecting the residual water that might have penetrated into the coupling 26 and 23b, and transferring the residual water to the end of the slab.

As shown in FIGS. 4 and 7, the processes formed by the folds 21a, 21b of the slabs that are housed in the recesses 15 and 16 of the fixing bracket 12 are substantially horizontal. The upward thrust of the wind, that acts both on the flat surface in the centre of the slab 10, and on the joint 11 formed by the coupling of the opposite lateral edges 17 and 18 of two contiguous slabs, has a component having a direction, with respect to the horizontal axes of the recesses 15 and 16, tilted from the bottom at the centre of the joint upwards in the portion that is distal relative to the joint 11.

This component determines a rotation of the slab in the portion from the fold 18a to the fold 22a, clockwise on the left side identified by the letters b of FIG. 8, and anticlockwise on the right side identified by the letters a of FIG. 8. This rotation determines housing of the folds 21a, 21b in the indentations 15a and 16a.

According to the embodiment shown in FIG. 9, the two vertical portions between the folds 22a, 22b and the folds 23a, 23b adhere to one another in the coupled joint so as to prevent the exit of the folds 21a, 21b from the recesses 15 and 16.

Consequently the seal limit for wind uplift, or lifting thrust of the wind, of the system of the present invention is uniquely determined by the resistance of the fixing bracket 12 which, if built for example of metal, is extremely high, and by the resistance of the material used for the slabs.

Consequently an increase in thickness of the metal or the use of very tenacious metals, special aluminium, steel, or other alloys, proportionally increases the resistance of the whole system.

Further, the solution according to the present invention determines an interference stress between the slab 10 and the fixing bracket 12 only in the moment of mechanical stress, for example during a meteorological event with very strong winds. This leaves total freedom between slabs 10 and fixing brackets 12 in normal conditions and significantly improves the longitudinal sliding necessary for the free heat dilation of the slabs, even in the case of very long slabs.

The slabs can be mounted on the sub-structure following the following procedure: after mounting on the lateral edge 17 of the first slab, the fixing brackets 12 are coupled manually to the lateral edge 18 of the first slab and subsequently fixed with the screws to the sub-structure, not shown in the drawings; subsequently, the subsequent slab is brought near with the lateral edge 17 at the lateral edge 18 of the already mounted slab, such that simple pressure of the edge 17 at the fixing brackets 12 causes snap fitting thereof exploiting the normal elasticity of the material used.

The operation will be repeated until the roof has been completely assembled. The operations are identical for dismantling but are conducted in reverse order.

It should be noted that unlike the stress of the wind that occurs simultaneously on both sides of the joint 11, the assembly (and dismantling) steps occur on one side of the slab at a time because they would otherwise be prevented by the fact that the two vertical portions between the folds 22a, 22b and the folds 23a, 23b adhere to one another, thus preventing the folds 21a, 21b from exiting the recesses 15 and 16.

According to a further embodiment illustrated in FIG. 10, a further bracket 30 is used, that replaces the fixing bracket 12, which is provided with a magnetic system adapted to simplify assembly and dismantling of the slabs, as described below.

In FIG. 11, an exploded view of this bracket is shown, which consists of three elements, a base 31, a rotating element 32 and a ferromagnetic cylinder 33. FIG. 12 depicts a perspective view of the bracket 30; The base 31 is made for housing the lateral edge 18 of the slab as shown in FIGS. 8 e 9. The geometry on that side is in fact substantially identical to the fixing bracket 12.

The base has two holes 34 and a flat surface 35 identically to the details 14 and 13 of the fixing bracket 12 in FIG. 7. The holes are intended to house the fixing screws for fixing to the sub-structure, which is not shown. On the opposite side of the bracket there is a semicylindrical housing 36 with an axis parallel to the flat surface 35 and to the direction of the joint 11 of FIG. 1.

This semicylindrical housing houses the cylinder 37 of the rotating element 32. The upper conformation of the rotating element is substantially identical to that of the fixing bracket 12 that houses the lateral edge 17 of the slab as in FIGS. 8 and 9. The rotating element 32 can rotate around the axis of the cylinder 37 by widening the space between the portions 15' and 16', so as to facilitate the operations of insertion and removal of the ends of the slabs, i.e. the steps of assembling and dismantling the system and in particular housing the folds 21a, 21b in the recesses 15 and 16.

The base 31 and the rotating element 32 have vertical holes 38a and 38b that are substantially perpendicular to the axis of the semicylindrical housing 36 and of the cylinder 37, in which the ferromagnetic cylinder 33 is housed.

Before assembly, with the system open, the rotating element is in the position of FIG. 13 and the ferromagnetic cylinder 33 occupies only the hole 38b of the rotating element 32, without locking the rotation. With the system assembled, the element 32 rotates to compress the inserted slab until it is in the position of FIG. 14 and the ferromagnetic cylinder 33 descends and occupies both the hole 38a as well as 38b, preventing rotation in an opposite opening direction of the rotating element. The passage from the position of FIG. 14 to the position of FIG. 13 is possible with the application from the exterior of a magnet, which is not shown, that determines lifting of the ferromagnetic cylinder 33, enabling in this manner rotation of the rotating element 32 and resulting dismantling of the lateral edge 17 of the slab.

According to the embodiment shown in FIG. 15, the slabs can be installed above a customised sandwich panel 40 and with apposite brackets that can be retained by the insulating mould of the sandwich panel or they can be fixed to the sub-structure.

In this case, the slab 10 is not glued to the insulating material and is in fact mounted in the manner described previously with a vertical translation from above. The only difference in the profile is the lack of the folds 18a, 18b, 19a and 19b that in this application are not necessary.

Note that the illustrations are merely indicative of the patented system, and the various dimensions and inclinations can be freely changed, customised and set up and conceived without influencing basic concepts and the scope of protection defined by the following claims.

Further, the drawings show ideally a system of slabs that are provided with lateral edges 17 and 18 on each slab, but this can be reversed on the two sides or slabs can be conceived that are totally symmetrical with lateral edges 17 on both sides that are coupled with symmetrical slabs characterised by lateral edges 18 on both the sides, which are mounted alternately.

The invention has been described in the foregoing with reference to a preferential embodiment and two variants thereof.

The invention claimed is:

1. A coating cover with a metal structure for roofs of buildings, comprising:
   a plurality of slabs of substantially quadrilateral shape, each of which is provided with lateral edges that are parallel and opposite to one another for mutual connection between adjacent slabs in a longitudinal direction and for formation of a joint positioned between each of the adjacent slabs, the lateral edges comprising a first set of folds at least partially symmetrical on the lateral edges, a second set of folds on at least one of the lateral edges, and a third set of folds on at least the other of the lateral edges and configured to interlock with said second set of folds; and
   at least one fixing bracket that is configured to join the lateral edges, said fixing bracket having at least two recesses that are symmetrical to one another and indentations that are symmetrical to one another,
   wherein said lateral edges comprise at least one curvature defined by a first portion of the first set of folds that overlay a second portion of the first set of folds so as to accommodate the fixing bracket,
   said recesses of the fixing bracket being defined respectively by two portions projecting upwards and folded partially downwards in a direction of a space between the recesses to define said indentations that extend upwards,
   wherein said recesses of the fixing bracket include a flat portion that extends along a horizontal direction between the two portions projecting upwards, and in which the indentations of said recesses house said at least one curvature formed by the second portion of the first set of folds placed respectively to the lateral edges of the slab so as to join the second portion of the first set of folds in order to compensate for a rotation caused by stress due to wind-uplift.

2. The coating cover with a metal structure for roofs of buildings according to claim 1, in which a plurality of said at least one fixing bracket is configured to connect each joint to a sub-structure of the roof; each fixing bracket comprising a body having a conformation defined by a flat base surface that, in use, rests on the sub-structure of the roof to which, in use, is fixed by fixing elements passing through holes, said fixing bracket being symmetrically shaped relative to a middle plane of symmetry perpendicular to the flat base surface and shaped to enable two consecutive slabs to be fixed by said second portion of the first set of folds that are inserted into respective opposite recesses formed respectively by said two portions and said indentations protruding upwards and reciprocally symmetrical relative to the middle plane of symmetry.

3. The coating cover with a metal structure for roofs of buildings according to claim 1, in which said lateral edges are symmetrical to one another, from an initial fold of the first set of folds, which is proximal to a central part of the slab, as far as a sixth fold of the first set of folds.

4. The coating cover with a metal structure for roofs of buildings according to claim 1, in which symmetrical folds of the first set of folds are placed respectively at the lateral edges of the slab, which return the edges of the slab to a substantially vertical position with an upward direction and substantially adjacent up to subsequent symmetrical folds of the first set of folds.

5. The coating cover with a metal structure for roofs of buildings according to claim 1, in which a first of the lateral edges of the slab starts, with a first of the first set of folds, continues upwards at one of the second set of folds, to then form a curve of 180° at a second of the second set of folds, covering, when engaged in the joint, a second of the lateral edges of an opposite slab.

6. The coating cover with a metal structure for roofs of buildings according to claim 5, in which the first of the lateral edges of the slab, has, at an end thereof, a third of the second set of folds, that, when engaged in the joint, adheres to a first of the third set of folds of the opposite slab.

7. The coating cover with a metal structure for roofs of buildings according to claim 6, in which the second of the lateral edges at the second and third of the second set of folds when engaged in the joint, defines a channel that is adapted to collect residual water that has penetrated through a coupling of the second and third sets of folds.

8. The coating cover with a metal structure for roofs of buildings according to claim 1, in which the fixing bracket is folded in a direction that is reciprocally symmetrically parallel to a middle plane of symmetry from a bottom of the indentations, in which said recesses of the fixing bracket house said at least one curvature formed by the first portion of the first set of folds placed horizontal and parallel to the base of said fixing bracket, and in which the indentations are adapted to accommodate said at least one curvature formed by the second portion of the first folds placed respectively at the ends of the slab during the rotation caused by stresses due to the wind uplift, in which said portion that engages in the respective fold of a first of the lateral edges of the slab is made with a rotating body provided with a cylindrical portion that rotates in a semicylindrical housing obtained in a base of said fixing bracket with an axis parallel to a joint direction of two contiguous slabs.

9. The coating cover with a metal structure for roofs of buildings according to claim 8, in which said base and said rotating body comprise a first hole and a second hole, respectively, that are perpendicular to an axis of the semicylindrical housing of the base and of the cylindrical portion of the rotating body, and adapted to accommodate a ferromagnetic cylinder.

10. The coating cover with a metal structure for roofs of buildings according to claim 9, in which said rotating body rotates around an axis of the cylindrical portion to move from an open position, adapted to enable insertion of the first of the lateral edges of the slab, to a closed position for fixing the slab and remaining locked by the ferromagnetic cylinder, which is housed simultaneously in the second hole of the rotating body and in the first hole of the base.

11. The coating cover with a metal structure for roofs of buildings according to claim 10, in which said ferromagnetic cylinder is capable of being released by uncoupling the slab from a magnet outside the slab so as to remain only in the second hole of the rotating body, being released from the first hole of the base and enabling the rotating body to rotate and the slab to be uncoupled.

* * * * *